United States Patent
Souma

(10) Patent No.: US 7,593,164 B2
(45) Date of Patent: Sep. 22, 2009

(54) ZOOM LENS SYSTEM AND IMAGE-SENSING APPARATUS HAVING IMAGE SHAKE CORRECTING CAPABILITY

(75) Inventor: Yoshihito Souma, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/133,877

(22) Filed: Jun. 5, 2008

(65) Prior Publication Data
US 2008/0304167 A1    Dec. 11, 2008

(30) Foreign Application Priority Data
Jun. 7, 2007    (JP) .............................. 2007-151790

(51) Int. Cl.
G02B 15/14    (2006.01)
G02B 27/46    (2006.01)
(52) U.S. Cl. .................... 359/676; 359/557; 348/240.3; 396/73
(58) Field of Classification Search ................. 359/676, 359/683–685, 554–557; 396/72–88; 348/240.99–240.3, 348/335–369
See application file for complete search history.

(56) References Cited

U.S. PATENT DOCUMENTS

| | | | |
|---|---|---|---|
| 7,139,131 B2 | 11/2006 | Nanba et al. | 359/687 |
| 7,177,092 B2 | 2/2007 | Satori et al. | 359/683 |
| 7,209,299 B2 | 4/2007 | Aoki | 359/683 |
| 2006/0056055 A1 | 3/2006 | Obama et al. | 359/689 |

*Primary Examiner*—Darryl J Collins
(74) *Attorney, Agent, or Firm*—Sidley Austin LLP

(57) ABSTRACT

A zoom lens system having an image shake correcting capability has, from the object side to the image side: a first lens group having a positive optical power, a second lens group having a negative optical power, a third lens group having a positive optical power, a fourth lens group having a negative optical power, and a fifth lens group having a positive optical power. The third lens group includes a positive lens component and a cemented lens element having a positive optical power. The cemented lens element is moved in a direction perpendicular to the optical axis to correct image shake, and the conditional formula $1.7 < nd3p$ is fulfilled, where $nd3p$ represents the average index of refraction of one or more positive lens elements in the positive lens component.

11 Claims, 14 Drawing Sheets

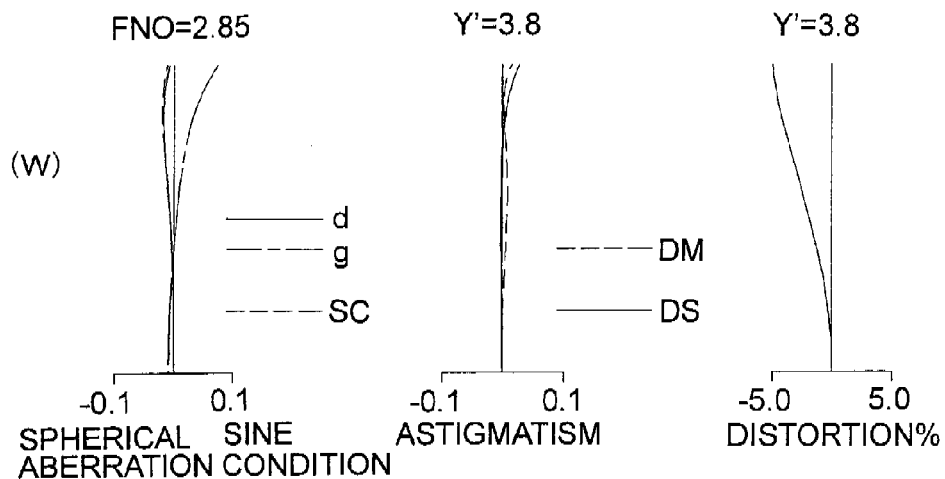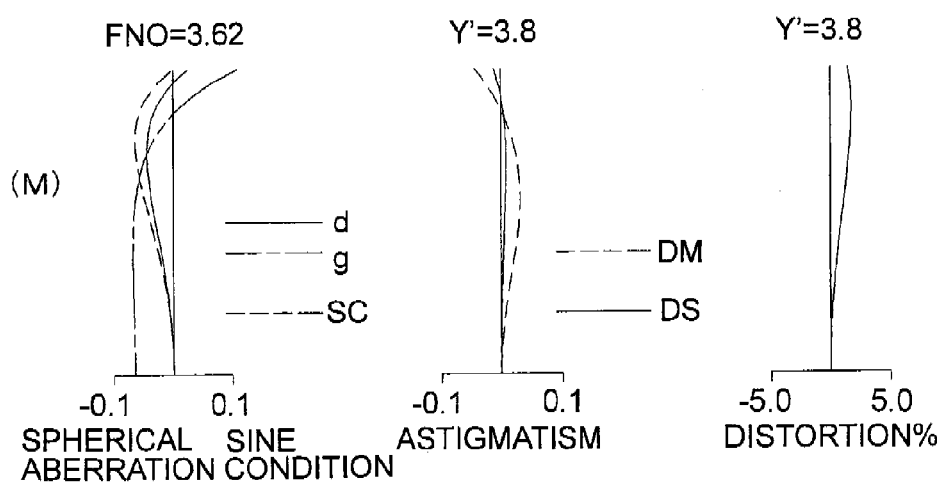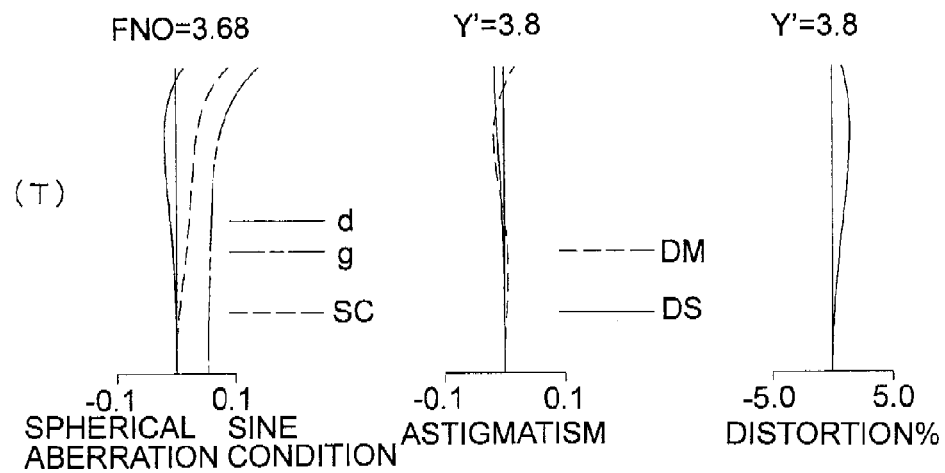

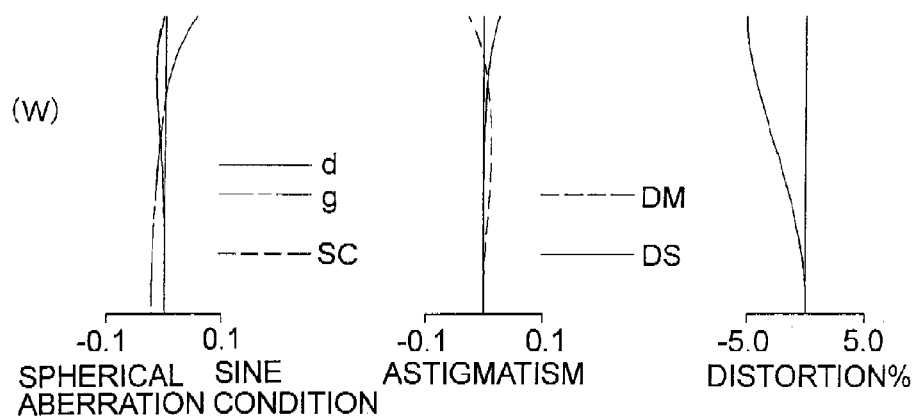

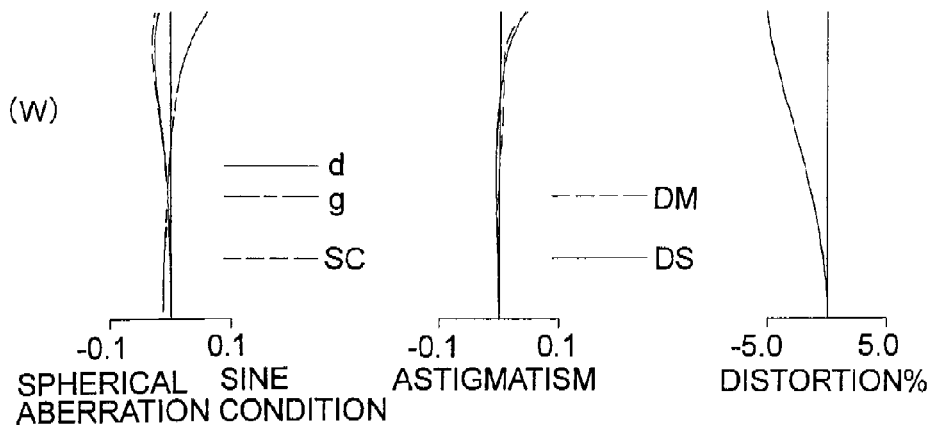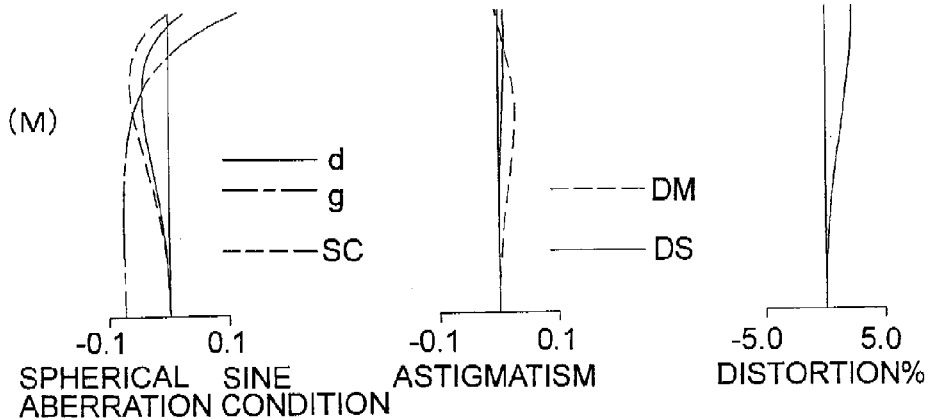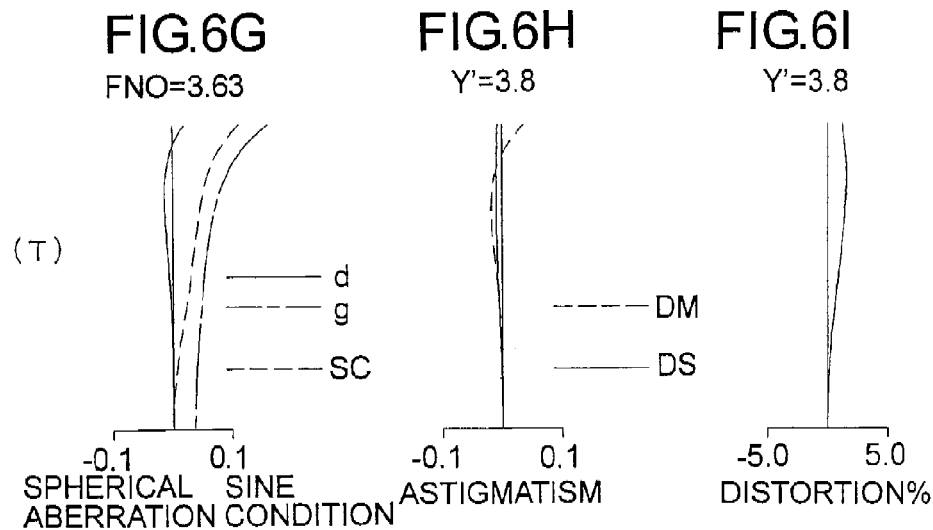

ZOOM LENS SYSTEM AND IMAGE-SENSING APPARATUS HAVING IMAGE SHAKE CORRECTING CAPABILITY

This application is based on Japanese Patent Application No. 2007-151790 filed on Jun. 7, 2007, the contents of which are hereby incorporated by reference.

BACKGROUND OF THE INVENTION

1. Field of the Invention

The present invention relates to a zoom lens system having an image shake correcting capability, and to an image-sensing apparatus having an image shake correcting capability. More specifically, the invention relates to a compact zoom lens system having an image shake correcting capability for use in an optical unit or the like for capturing an image of a subject by use of an image sensor, in particular one having a zoom ratio (magnification variation ratio) of 7× or more, offering satisfactory optical performance from a wide-angle to a telephoto region, and suffering little degradation in performance when correcting image shake, and also relates to an image-sensing apparatus or the like incorporating such a zoom lens system.

2. Description of Related Art

Rapidly widespread in recent years, digital cameras are today widely used not simply as a means for capturing images into computers but also as a tool for creating photographs like conventional silver-halide cameras. With this trend, demands are increasing for compactness and for functions useful for creating photographs (for example, higher zoom ratios, wider angles of view, hand-shake correction, etc.). Moreover, with the ever-increasing number of pixels in image sensors, demands are also high for higher optical performance. Even in appliances (for example, camcorders) mainly for capturing moving pictures, demands are increasing for higher optical performance than ever to offer an enhanced still-picture shooting capability and to cope with high-definition TV.

As a means to meet these demands, U.S. Pat. No. 7,209,299 B2 proposes a vibration-damped zoom lens system composed of, from the object side thereof, a first lens group having a positive optical power, a second lens group having a negative optical power, a third lens group having a positive optical power, a fourth lens group having a negative optical power, and a fifth lens group having a positive optical power.

Disadvantageously, however, the zoom lens system disclosed in U.S. Pat. No. 7,209,299 B2 mentioned above is designed as an interchangeable lens for single-lens reflex cameras, and accordingly it has a zoom ratio as modest as about 5× and is not satisfactorily compact; it also suffers an unignorable degradation in performance when correcting image shake.

SUMMARY OF THE INVENTION

Under the background described above, it is an object of the present invention to provide a satisfactorily compact zoom lens system that, despite having a zoom ratio as high as about 12×, offers high optical performance and that, even when correcting image shake, offers high optical performance, and to provide an image-sensing apparatus incorporating such a zoom lens system.

To achieve the above object, according to one aspect of the invention, a zoom lens system having an image shake correcting capability comprises, from the object side to the image side, a first lens group having a positive optical power, a second lens group having a negative optical power, a third lens group having a positive optical power, a fourth lens group having a negative optical power, and a fifth lens group having a positive optical power. Here, the third lens group includes a positive lens component and a cemented lens element having a positive optical power. The cemented lens element is moved (shifted eccentrically) in a direction perpendicular to the optical axis to correct image shake, and conditional formula (1) below is fulfilled:

$$1.7 < nd3p \qquad (1)$$

where nd3p represents the average index of refraction of one or more positive lens elements in the positive lens component.

According to another aspect of the invention, an image-sensing apparatus comprises a zoom lens system and an image sensor that converts an optical image formed on the sensing surface thereof into an electrical signal, with the zoom lens system so arranged that an optical image of the subject is formed on the sensing surface of the image sensor. Here, the zoom lens system has an image shake correcting capability and comprises, from the object side to an image side, a first lens group having a positive optical power, a second lens group having a negative optical power, a third lens group having a positive optical power, a fourth lens group having a negative optical power, and a fifth lens group having a positive optical power. The third lens group includes a positive lens component and a cemented lens element having a positive optical power. The cemented lens element is moved in a direction perpendicular to the optical axis to correct image shake, and conditional formula (1) above is fulfilled.

According to yet another aspect of the invention, a digital device comprises an image-sensing apparatus and a controller that makes the image-sensing apparatus shoot at least either a still picture or a moving picture of the subject. Here, the image-sensing apparatus comprises a zoom lens system and an image sensor that converts an optical image formed on the sensing surface thereof into an electrical signal, with the zoom lens system so arranged that an optical image of the subject is formed on the sensing surface of the image sensor. The zoom lens system has an image shake correcting capability and comprises, from the object side to the image side, a first lens group having a positive optical power, a second lens group having a negative optical power, a third lens group having a positive optical power, a fourth lens group having a negative optical power, and a fifth lens group having a positive optical power. The third lens group includes a positive lens component and a cemented lens element having a positive optical power. The cemented lens element is moved in a direction perpendicular to the optical axis to correct image shake, and conditional formula (1) above is fulfilled.

BRIEF DESCRIPTION OF THE DRAWINGS

FIGS. 4A to 4I are longitudinal aberration diagrams of Example 1, before image shake correction;

FIGS. 5A to 5I are longitudinal aberration diagrams of Example 2, before image shake correction;

FIGS. 6A to 6I are longitudinal aberration diagrams of Example 3, before image shake correction;

DETAILED DESCRIPTION OF PREFERRED EMBODIMENTS

Figure 1:
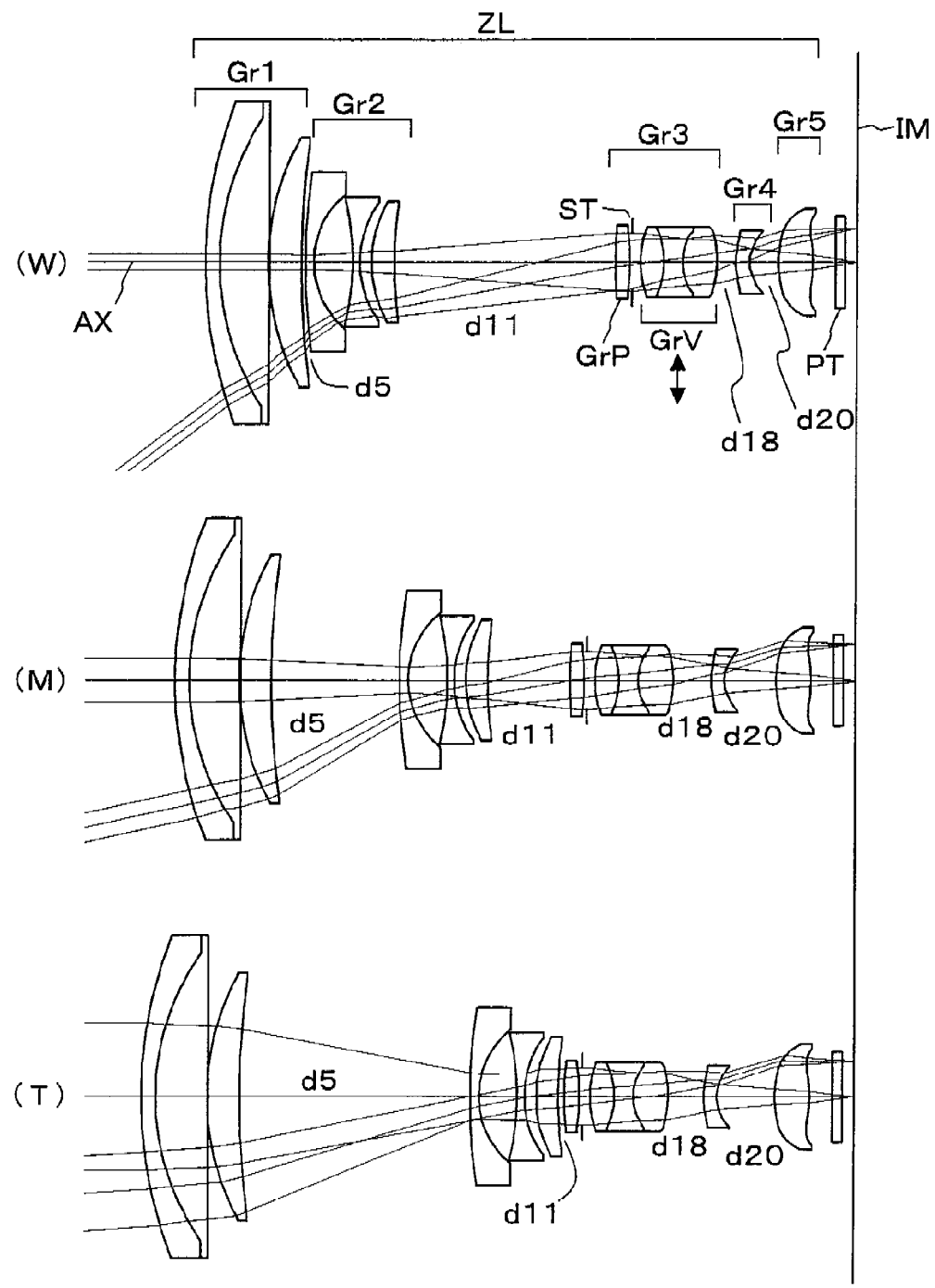
FIG. 1 is an optical arrangement diagram of a first embodiment (Example 1) of the invention.

Hereinafter, zoom lens systems, image-sensing apparatuses, etc. according to the invention will be described with reference to the accompanying drawings. According to the invention, a zoom lens system having an image shake correcting capability comprises, from the object side to the image side, a first lens group having a positive optical power, a second lens group having a negative optical power, a third lens group having a positive optical power, a fourth lens group having a negative optical power, and a fifth lens group having a positive optical power, wherein the third lens group includes a positive lens component and a cemented lens element having a positive optical power, and wherein the cemented lens element is moved (shifted eccentrically) in a direction perpendicular to the optical axis to correct image shake.

In general, in a case where image shake is corrected by moving part of the provided lens elements in a direction perpendicular to the optical axis, eccentric aberrations ascribable to the eccentricity of the relevant lens elements are troublesome. Eccentric aberrations include image surface inclination, eccentric coma, eccentric lateral chromatic aberration, off-axial image point movement errors, etc. To satisfactorily suppress these eccentric aberrations, it is necessary to sufficiently hold down the aberration produced by the eccentric lens component when it is not shifted eccentrically. Thus a certain degree of flexibility for aberration correction is needed in the eccentric lens component.

Inconveniently, however, building the eccentric lens component with a plurality of lens elements tends to complicate the design of and hence increase the size of the lens frame. Moreover, the use of a plurality of optical elements increases the factors producing errors when they are assembled into the lens frame. The lens frame is fitted with a driving means for image shake correction etc., and is then fitted to a stationary barrel. Thus, if a fault in assembly is found in the inspection at the finished stage, remedying it requires removal of the driving means etc. In view of the foregoing, for higher efficiency in mass production, it is preferable that the eccentric lens component be composed of a single element, to minimize the factors producing errors. An eccentric lens component composed of a single element may be built with a single aspherical lens element. Inconveniently, however, this necessitates use of a low-dispersion material for the correction of eccentric lateral chromatic aberration, resulting in less flexibility for correction of other aberrations including chromatic aberration.

In view of the inconveniences mentioned above, a zoom lens system according to the invention adopts a cemented lens element as the eccentric lens component. Using a cemented lens element as the eccentric lens component gives a certain degree of flexibility for correction of the aberration produced by the eccentric lens component, and also offers improved efficiency in mass production. On the other hand, in a zoom lens system adopting a positive-negative-positive-negative-positive arrangement—one common for high zoom ratios (magnification variation ratio)—, a large part of the converging power of the entire system is distributed to the third lens group. Thus, to make the optical system compact, it is preferable that the third lens group be given a strong optical power. In a zoom lens system according to the invention, the third lens group includes a positive lens component and a cemented lens element having a positive optical power, and this makes it easy to give the third lens group the desired optical power.

The third lens group may include, from the object side, a positive lens component and a cemented lens element having a positive optical power, or may include, from the object side, a cemented lens element having a positive optical power and a positive lens component. From the perspective of aberration correction, it is preferable that the third lens group include, from the object side, a positive lens component and a cemented lens element having a positive optical power. With this arrangement, the axial rays that have entered the third lens group first have their heights lowered by the positive lens component and then enter the cemented lens element. This makes it possible to give a strong optical power to a negative lens element in the cemented lens element, and thereby to achieve the desired correction of chromatic and spherical aberrations.

As described previously, it is preferable that the eccentric lens component produce as little aberration as possible; in addition it is preferable that the other element in the third lens group, namely the positive lens component, produce as little aberration as possible. The reason is that, even when, of the two elements constituting the third lens group, one produces sufficiently little aberration, unless the other too produces sufficiently little aberration, it is not possible to sufficiently hold down the aberration produced by the entire third lens group, and thus it is difficult to satisfactorily suppress the eccentric aberration produced when the entire third lens group is shifted eccentrically. Accordingly, from the perspective of the eccentric sensitivity of the entire third lens group and the eccentric sensitivity of the eccentric lens component in it, namely the cemented lens element, it is preferable that the positive lens component, which remains stationary within the third lens group, have a high index of refraction.

In view of the foregoing, it is preferable that conditional formula (1) below be fulfilled.

$$1.7 < nd3p \qquad (1)$$

where nd3p represents the average index of refraction of any— one or more—positive lens elements in the positive lens component.

Conditional formula (1) defines a preferable conditional range with regard to the index of refraction of any positive lens element or elements constituting the positive lens component. If the lower limit of conditional formula (1) is disregarded, the index of refraction of the positive lens element(s) constituting the positive lens component is so low that it is difficult to satisfactorily suppress the aberration produced by the positive lens component; in that case, the positive lens component needs, to satisfactorily suppress the aberration it produces, a larger number of lens elements, leading to increased cost and size.

It is further preferable that conditional formula (1a) below be fulfilled.

$$1.75<nd3p \qquad (1a)$$

This conditional formula (1a) defines, within the conditional range defined by conditional formula (1) above, a further preferable conditional range in view of the foregoing and other factors.

It is preferable that at least one positive lens element in the positive lens component fulfill conditional formula (2) below.

$$-0.7<(R1+R2)/(R1-R2)<0.6 \qquad (2)$$

where
  R1 represents the radius of curvature of the object-side surface of the at least one positive lens element in the positive lens component; and
  R2 represents the radius of curvature of the image-side surface of the at least one positive lens element in the positive lens component.

Conditional formula (2) defines a preferable conditional range with regard to the shape of at least one of the positive lens element(s) constituting the positive lens component. If the range defined by conditional formula (2) is disregarded, the relevant positive lens element produces so much spherical aberration that it is difficult to satisfactorily suppress the eccentric coma produced at eccentric shifting.

It is further preferable that conditional formula (2a) below be fulfilled.

$$-0.5<(R1+R2)/(R1-R2)<0.5 \qquad (2a)$$

This conditional formula (2a) defines, within the conditional range defined by conditional formula (2) above, a further preferable conditional range in view of the foregoing and other factors.

It is preferable that the positive lens component be composed of a single positive lens element. Building the positive lens component with a single positive lens element makes it possible to make the entire third lens group light and compact. For example, fulfilling conditional formulae (1) and (2) simultaneously makes it possible to satisfactorily suppress the aberration produced by the positive lens component and simultaneously to obtain the optical power desired in the positive lens component with a single positive lens element.

It is preferable that, over the entire zoom range, conditional formula (3) below be fulfilled.

$$0.5<(1-\beta c)/\beta r<3.0 \qquad (3)$$

where
  βc represents the lateral magnification of the cemented lens element; and
  βr represents the composite lateral magnification of all the lens elements disposed to the image side of the cemented lens element.

Conditional formula (3) defines a preferable conditional range with regard to the sensitivity of the eccentric lens component to image shake correction. If the lower limit of conditional formula (3) is disregarded, the distance traveled by an image point on the image surface as the eccentric lens component is moved over a given distance on the plane perpendicular to the optical axis is too short. Thus, unless the eccentric lens component is moved greatly, it is not possible to achieve satisfactory image shake correction. Securing a sufficient movement distance for the eccentric lens component makes the optical unit large. Moreover, unless the eccentric lens component is moved at sufficient speed, it is not possible to achieve the desired image shake correction. This makes also the driving means large. If the upper limit of conditional formula (3) is disregarded, the distance traveled by an image point on the image surface as the eccentric lens component is moved over a given distance on the plane perpendicular to the optical axis is too long. This, although preferable from the perspective of compactness, requires high accuracy in the means for detecting the position of the eccentric lens component; failure to meet this requirement makes it difficult to achieve satisfactory image shake correction, and increasing the position detection accuracy can lead to increased cost.

It is further preferable that conditional formula (3a) below be fulfilled.

$$0.7<(1-\beta c)/\beta r<2.5 \qquad (3a)$$

This conditional formula (3a) defines, within the conditional range defined by conditional formula (3) above, a further preferable conditional range in view of the foregoing and other factors.

It is preferable that the object-side boundary surface with air of the cemented lens element be convex to the object side, and that the image-side boundary surface with air of the cemented lens element be convex to the image side. This gives positive optical powers to both of the two boundary surfaces with air of the cemented lens element, and thus makes it possible to distribute between them the optical power desired in the third lens group. In this way, it is possible to avoid concentration of an optical power on a particular lens surface, and this is advantageous in sufficiently suppressing the aberration produced by the individual lens elements.

It is preferable that the cemented lens element be composed of three lens elements cemented together that are, from the object side, a positive lens element, a negative lens element, and a positive lens element. Building the cemented lens element by cementing three lens elements together makes it possible, while leaving the eccentric lens component composed of a single element, to further increase the flexibility for correction of the aberration produced by the cemented lens element. In particular, the cemented surfaces can be given relatively large curvatures, and this makes it possible to produce high-order aberration and thereby increase the flexibility for aberration correction. Moreover, arranging a positive lens element, a negative lens element, and a positive lens element in this order from the object side makes it easy to secure a positive optical power. That is, building the cemented lens element with two positive lens elements and one negative lens element arranged that way is advantageous in securing a positive optical power.

It is preferable that the third lens group have a stop (aperture stop) between the positive lens component and the cemented lens element having a positive optical power. Disposing a stop within the third lens group makes it possible to reduce the distance between the second and third lens groups at the telephoto end. It is thereby possible (since the axial rays emergent form the second lens group are divergent) to lower the heights of the axial rays passing through the third lens group. This makes it possible to suppress the spherical aberration and coma produced by the third lens group.

It is preferable that the fifth lens group remain stationary in an optical axis direction during zooming. Keeping the fifth lens group stationary during zooming contributes to effective simplification of the mechanism.

It is preferable that the fifth lens group be composed of a single positive lens element. The fifth lens group is close to the image surface, and therefore it allows the axial rays passing through it to travel at low heights, producing relatively little spherical aberration and coma. Thus building the fifth lens group with a single positive lens element helps reduce cost and make the optical system compact.

It is preferable that the fourth lens group be composed of a single negative lens element. The fourth lens group is relatively close to the image surface, and therefore it allows the axial rays passing through it to travel at low heights, producing relatively little spherical aberration and coma. Thus building the fourth lens group with a single negative lens element helps reduce cost and make the optical system compact.

A zoom lens system according to the invention is suitable for use as an image-sensing optical system in a digital device having an image capturing capability (for example, digital cameras, video cameras, etc.) and, by combining it with an image sensor or the like, it is possible to build an image-sensing apparatus that optically captures an image of a subject and that then outputs it in the form of an electrical signal. Here, an image-sensing apparatus is an optical apparatus used as a main component of a camera for shooting a still or moving images of a subject, and is built by being provided with, from the object (i.e. subject) side, an image-sensing optical system that forms an optical image of an object and an image sensor that converts the optical image formed by the image-sensing optical system into an electrical signal.

Examples of such cameras include: digital cameras, video cameras, surveillance cameras, car-mounted cameras, and cameras for videophones; and cameras incorporated in, or externally fitted to, personal computers, portable information devices (information device terminals that are compact and portable, such as mobile computers, cellular phones, and portable information terminals), peripheral devices for those (such as scanners and printers), and other digital devices. As these examples suggest, not only is it possible, by use of an image-sensing apparatus, to build a camera, it is also possible, by incorporating an image-sensing apparatus in various devices, to furnish them with camera capabilities. For example, it is possible to build a digital device having an image capturing capability, such as a cellular phone equipped with a camera.

Figure 13:
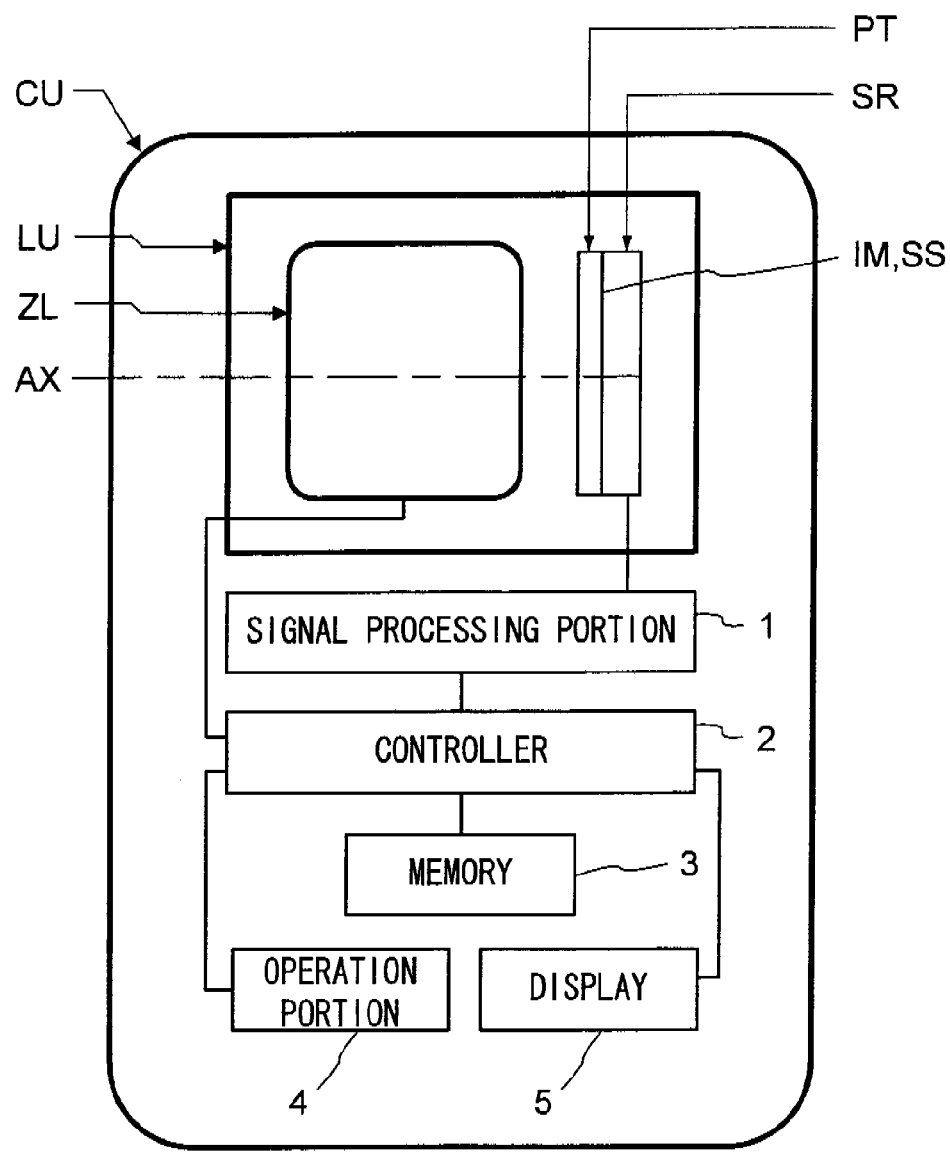
FIG. 13 is a schematic sectional view showing an outline of an example of the configuration of a digital device incorporating an image-sensing apparatus.

FIG. 13 is a schematic sectional view showing an outline of an example of the configuration of a digital device CU (corresponding to a digital device having an image capturing capability, such as a digital camera). The digital device CU shown in FIG. 13 incorporates an image-sensing apparatus LU, which comprises, from the object (i.e. subject) side: a zoom lens system ZL that forms an optical image (image surface) IM of an object at a variable magnification; a plane-parallel plate PT (corresponding to: an optical filter, such as an optical low-pass filter and an infrared cut filter, arranged as necessary; and the cover glass or the like of an image sensor SR); and an image sensor SR that converts the optical image IM formed on the sensing surface SS thereof by the zoom lens system ZL into an electrical signal. In a case where a digital device CU having an image capturing capability is built with this image-sensing apparatus LU, typically the latter is disposed inside the body of the former. It is, however, also possible to adopt any other construction to achieve a camera capability; for example, the image-sensing apparatus LU may be built as a unit that is freely attachable to and detachable from, or rotatable relative to, the main unit of the digital device CU.

Used as the image sensor SR is, for example, a solid-state image sensor such as a CCD (charge-coupled device) or CMOS (complementary metal oxide semiconductor) sensor having a plurality of pixels. The zoom lens system ZL is so arranged that an optical image IM of the subject is formed on the sensing surface SS of the image sensor SR. Thus the optical image IM formed by the zoom lens system ZL is converted into an electrical signal by the image sensor SR.

The digital device CU comprises, in addition to the image-sensing apparatus LU, a signal processing portion 1, a controller 2, a memory 3, an operation portion 4, a display 5, etc. The signal produced by the image sensor SR is subjected to, as necessary, predetermined digital image processing, image compression, and the like by the signal processing portion 1, and is then, as a digital video signal, recorded to the memory 3 (such as a semiconductor memory or an optical disc) or, as the case may be, transmitted to another device across a cable or after being converted into an infrared signal. The controller 2 is built around a microcomputer, and controls in a centralized fashion the image shooting functions, the image playback functions, and the lens movement mechanisms for zooming and focusing. For example, the controller 2 controls the image-sensing apparatus LU to shoot at least either a still picture or a moving picture of the subject. The display 5 includes a display device such as a liquid crystal monitor, and displays an image by using the image signal resulting from the conversion by the image sensor SR or image information recorded in the memory 3. The operation portion 4 includes operated members such as operation buttons (for example, a shutter-release button), operation dials (for example, a shooting mode dial), etc, and transmits the information entered by the operator to the controller 2.

The zoom lens system ZL has, as described previously, a five-lens-group, positive-negative-positive-negative-positive zoom arrangement, and achieves variation magnification (i.e. zooming) by moving more than one of the lens groups along the optical axis AX so as to vary the distances between them. The optical image to be formed by the zoom lens system ZL passes through an optical low-pass filter (corresponding to the plane-parallel plate PT in FIG. 13) having a predetermined cut-off frequency response determined by the pixel pitch of the image sensor SR; this allows the spatial frequency response of the optical image to be adjusted so as to minimize the so-called aliasing noise produced when it is converted into an electrical signal. This helps suppress color moiré. Keeping the performance around the resolution limit frequency moderate eliminates the need for an optical low-pass filter without fear of noise; nor is there any need for an optical low-pass filter in a case where the user shoots and views pictures by use of a display system on which noise is not conspicuous.

Figure 2:
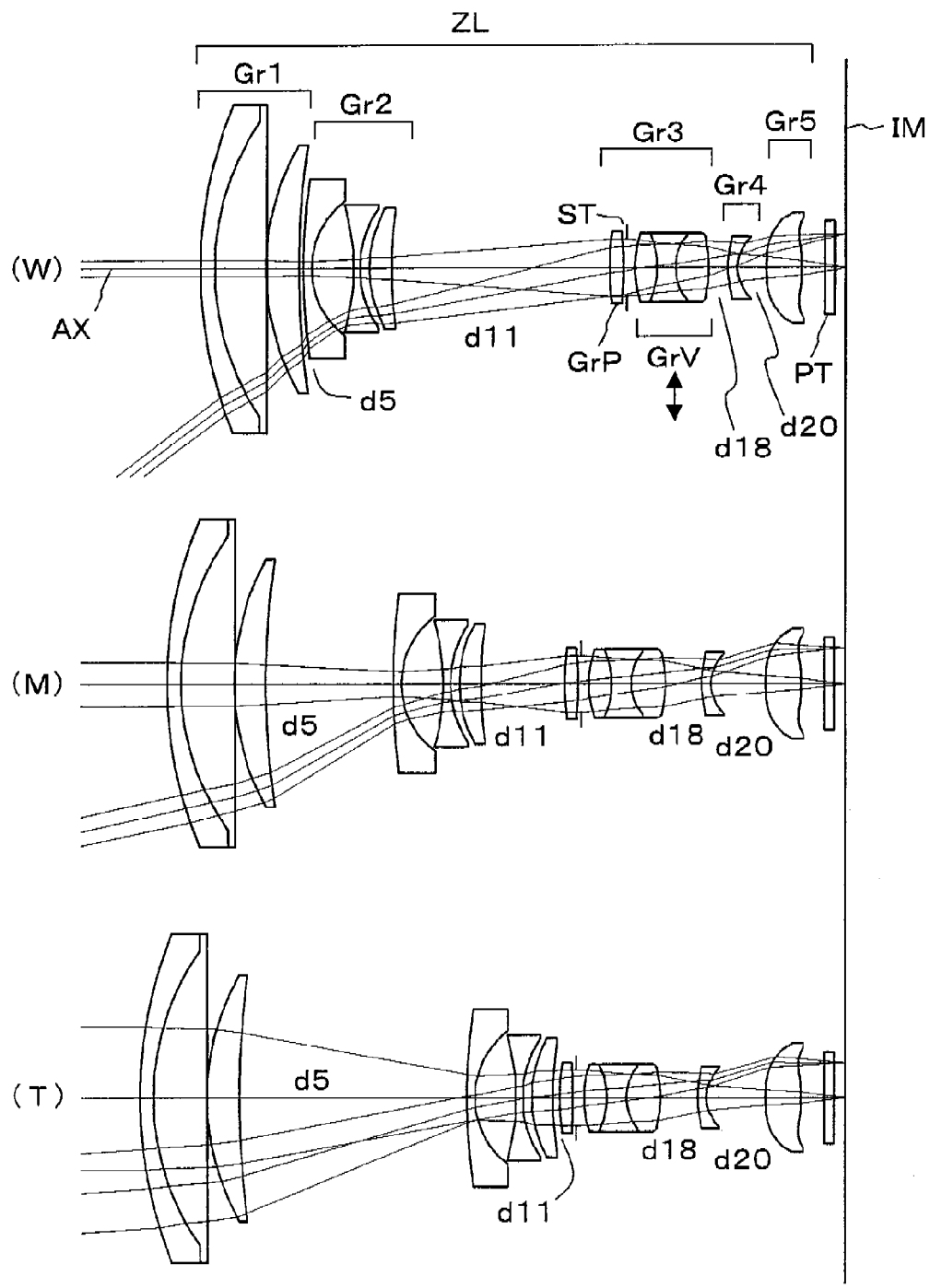
FIG. 2 is an optical arrangement diagram of a second embodiment (Example 2) of the invention.
Figure 3:
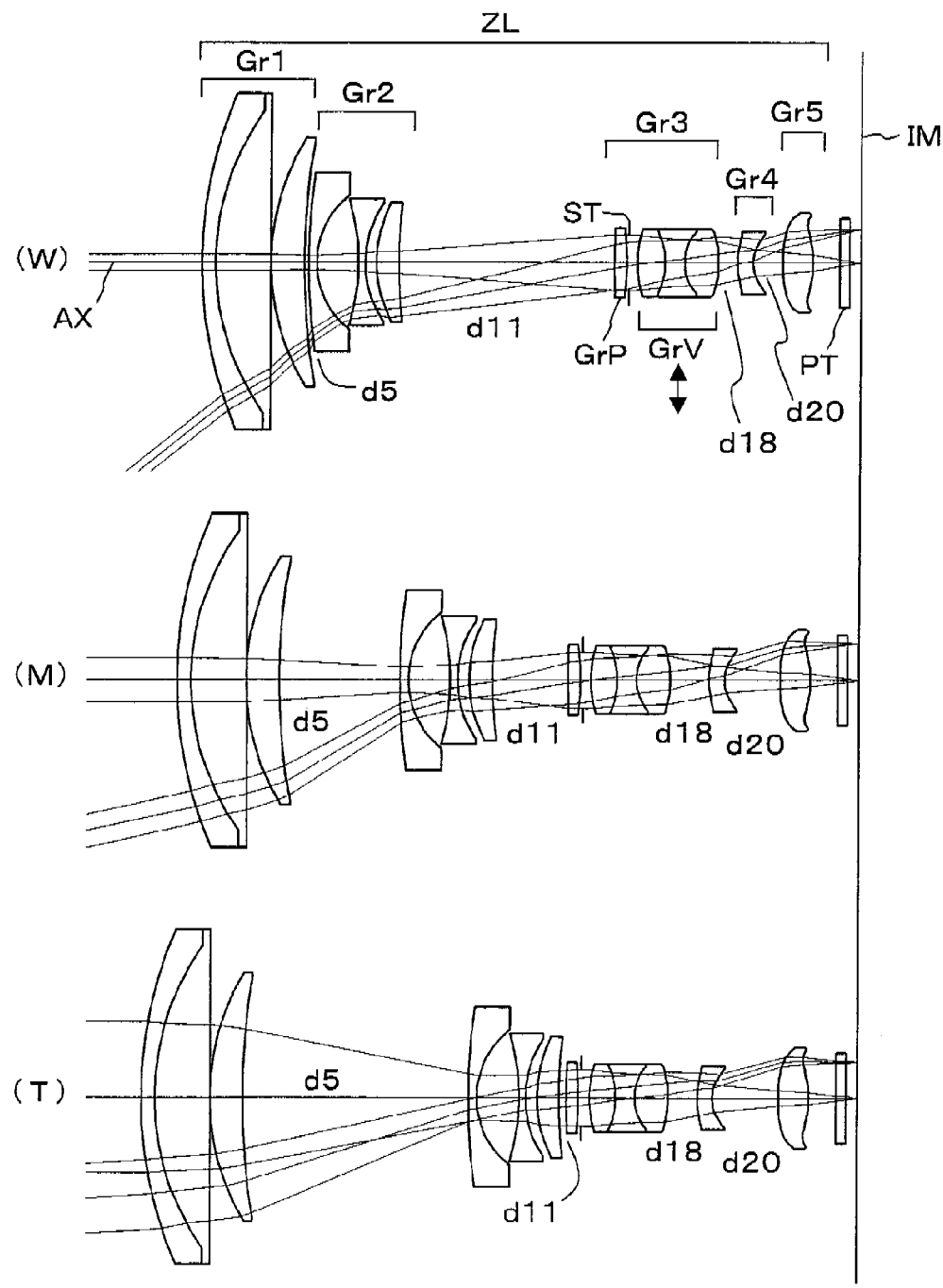
FIG. 3 is an optical arrangement diagram of a third embodiment (Example 3) of the invention.
Figure 7A:
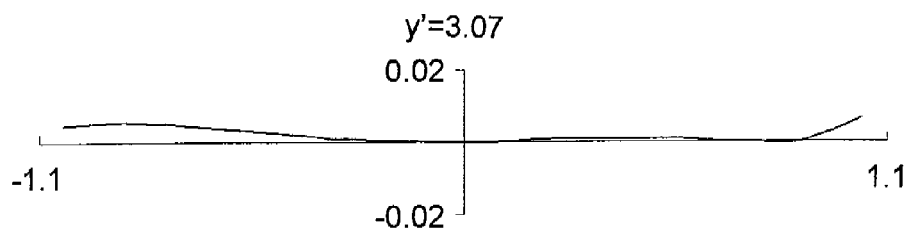
FIGS. 7A to 7E are lateral aberration diagrams of Example 1, before and after image shake correction, at the wide-angle end.
Figure 7B:
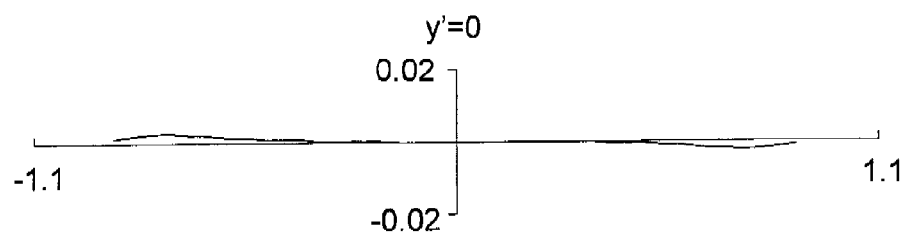
Figure 7C:
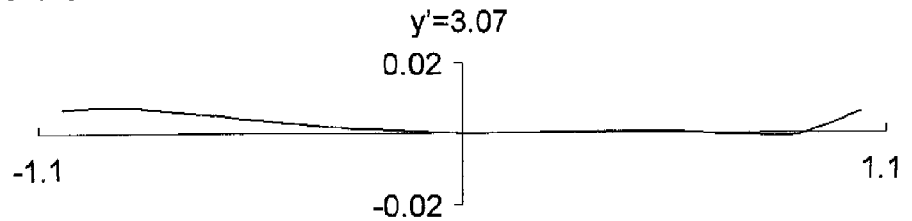
Figure 7D:
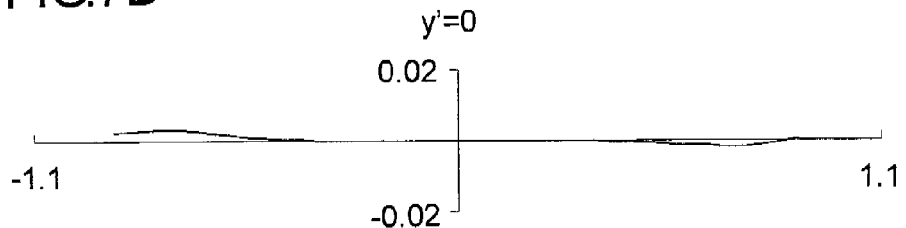
Figure 7E:
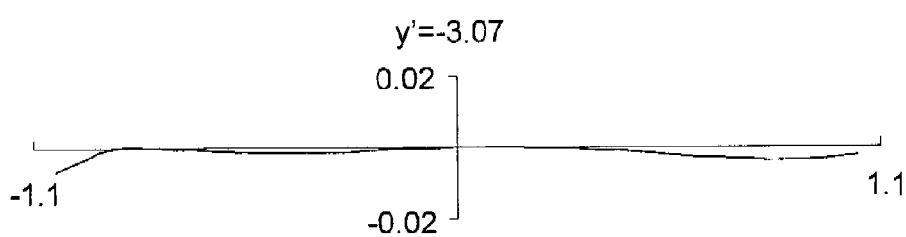
Figure 8A:
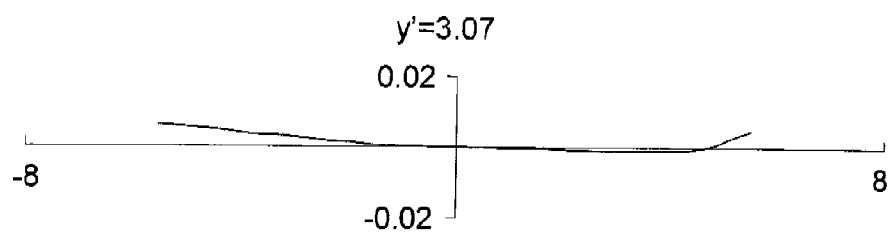
FIGS. 8A to 8E are lateral aberration diagrams of Example 1, before and after image shake correction, at the telephoto end.
Figure 8B:
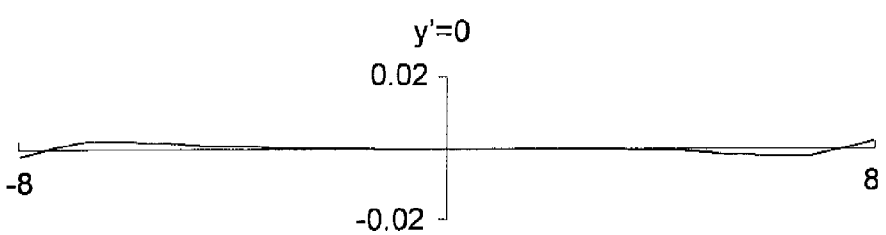
Figure 8C:
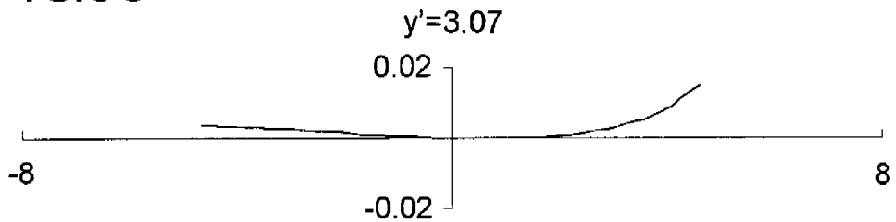
Figure 8D:
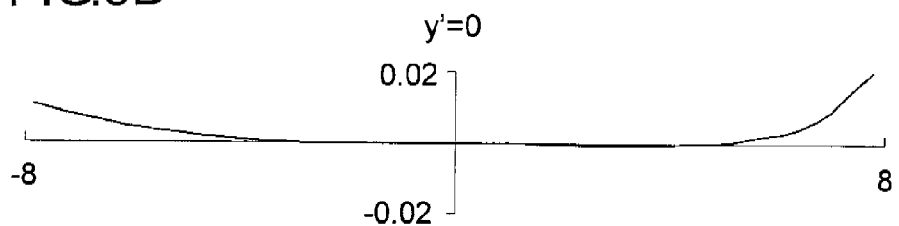
Figure 8E:
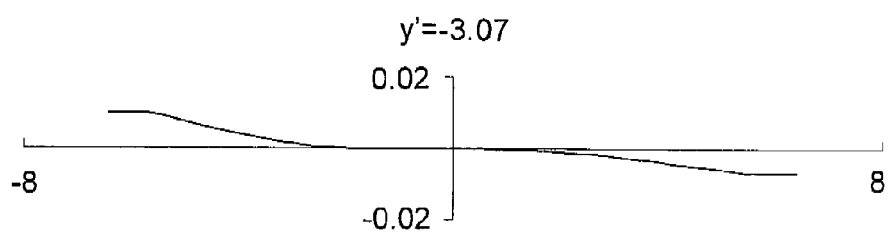
Figure 9A:
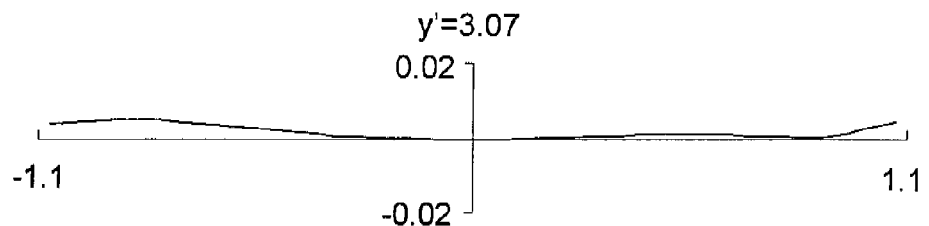
FIGS. 9A to 9E are lateral aberration diagrams of Example 2, before and after image shake correction, at the wide-angle end.
Figure 9B:
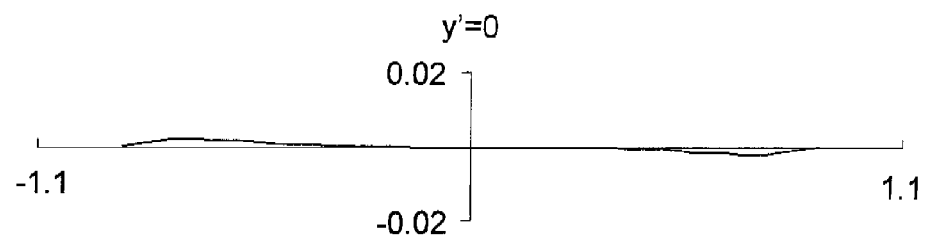
Figure 9C:
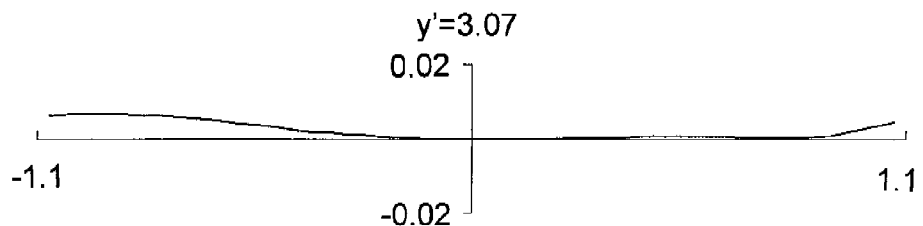
Figure 9D:
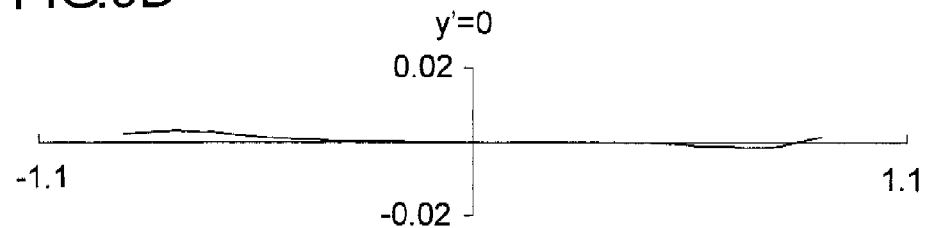
Figure 9E:
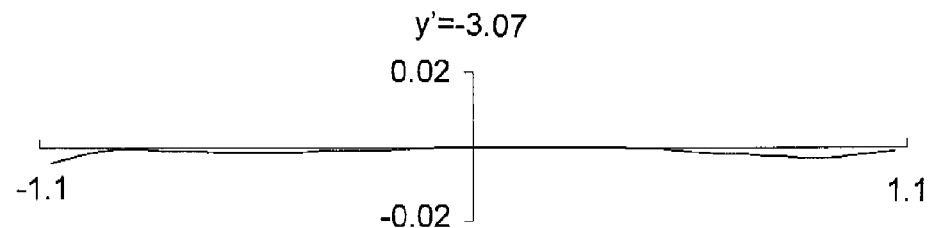
Figure 10A:
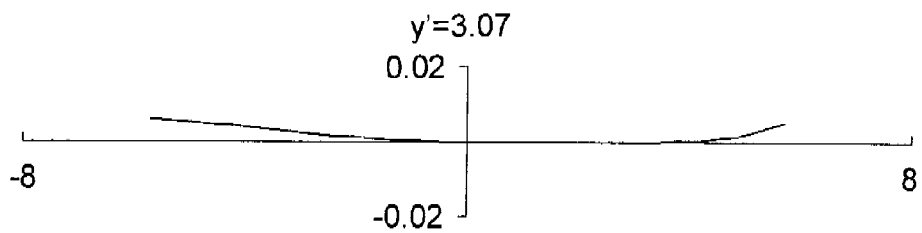
FIGS. 10A to 10E are lateral aberration diagrams of Example 2, before and after image shake correction, at the telephoto end.
Figure 10B:
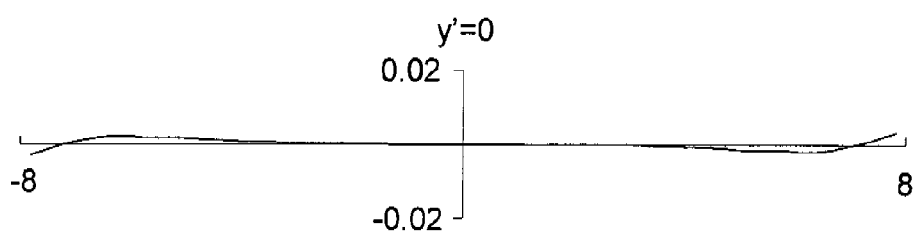
Figure 10C:
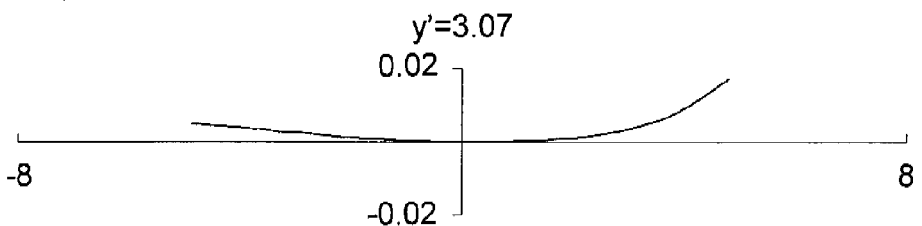
Figure 10D:
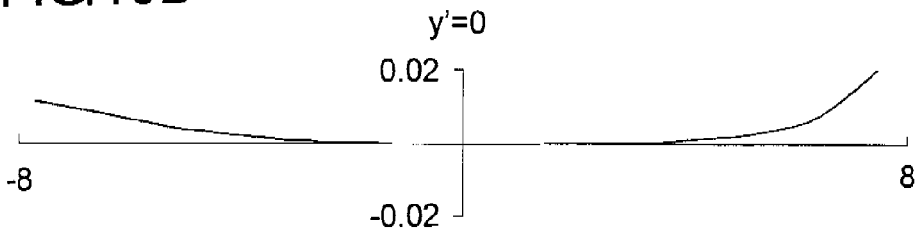
Figure 10E:
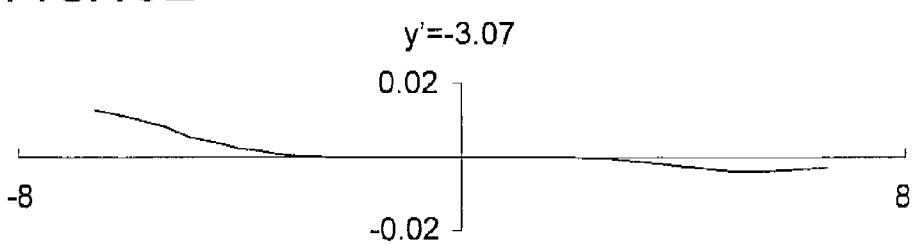
Figure 11A:
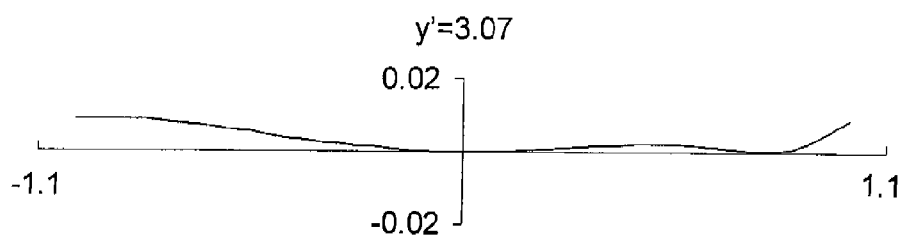
FIGS. 11A to 11E are lateral aberration diagrams of Example 3, before and after image shake correction, at the wide-angle end.
Figure 11B:
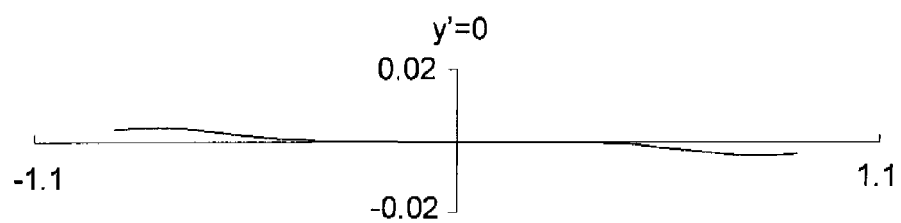
Figure 11C:
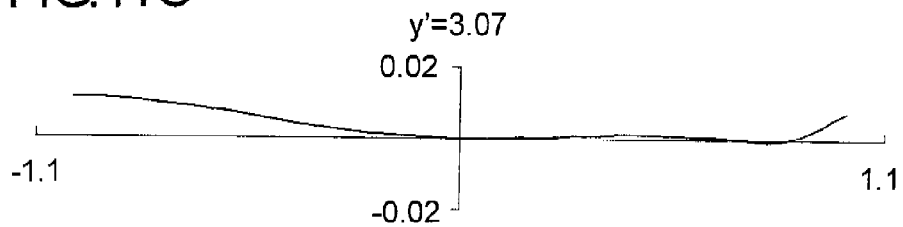
Figure 11D:
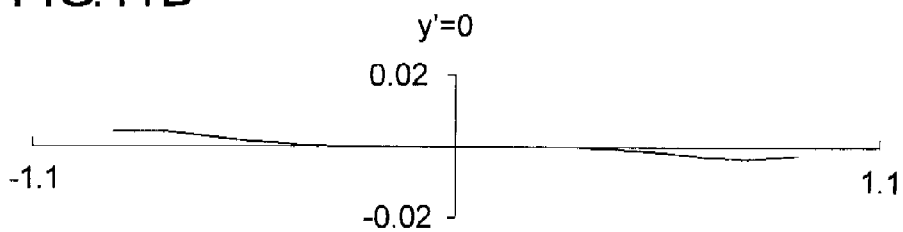
Figure 11E:
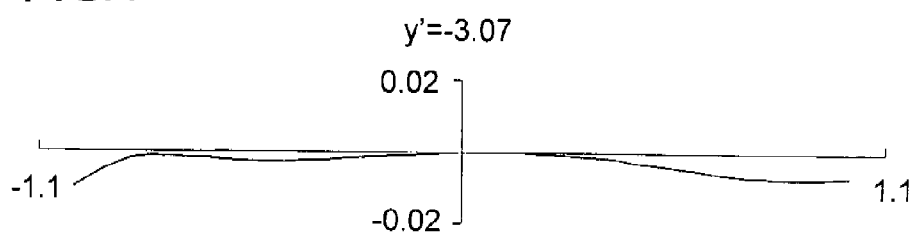
Figure 12A:
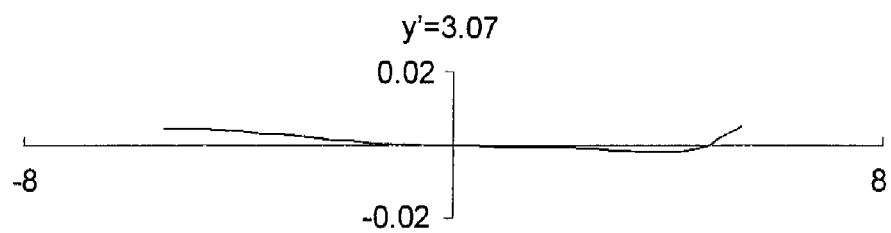
FIGS. 12A to 12E are lateral aberration diagrams of Example 3, before and after image shake correction, at the telephoto end.
Figure 12B:
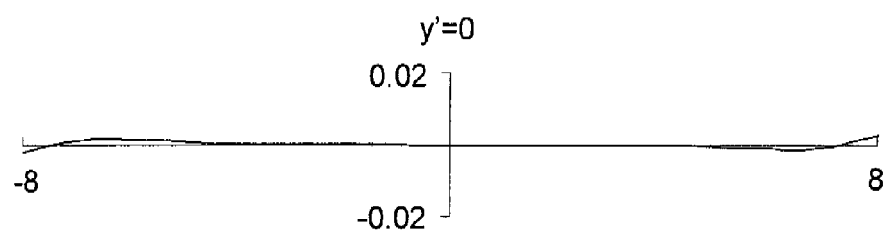
Figure 12C:
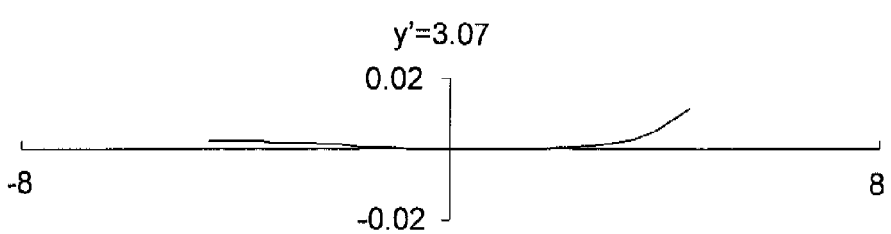
Figure 12D:
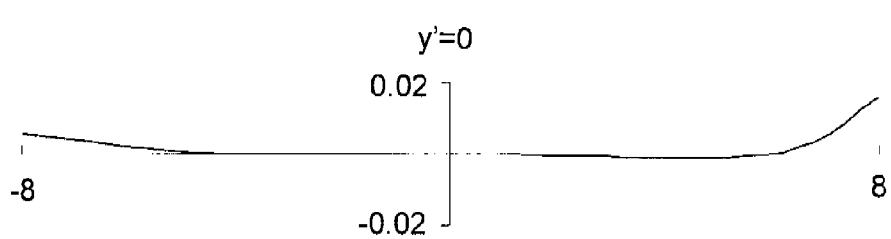
Figure 12E:
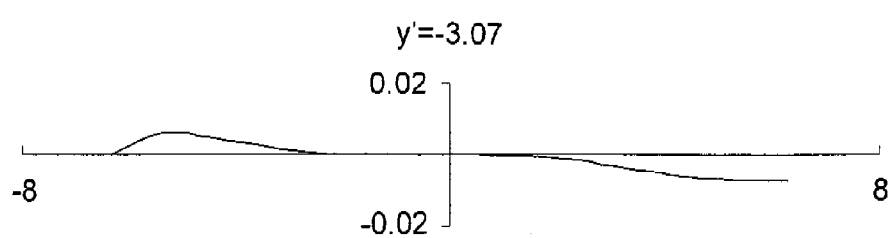
Figure 14A:
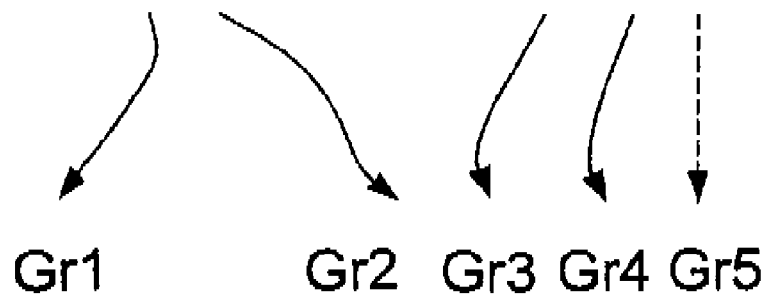
FIGS. 14A to 14C are diagrams schematically showing the zooming movement loci of the individual lens groups in the first to third embodiments (Examples 1 to 3) respectively.
Figure 14B:
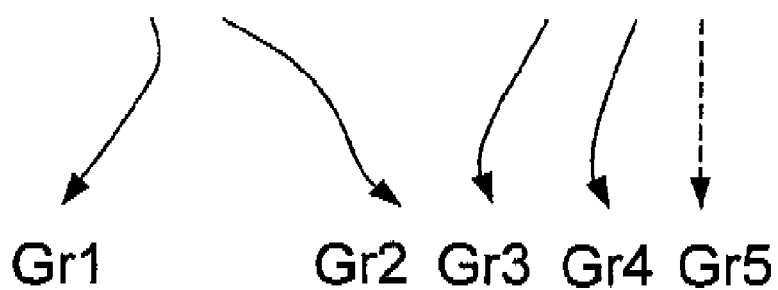
Figure 14C:
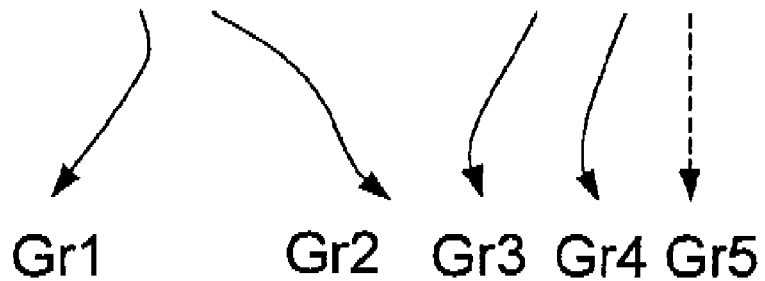

Next, the optical arrangement of the zoom lens system ZL will be described in more detail by way of three embodiments, namely a first to a third embodiment. FIGS. 1 to 3 show the lens arrangements of the zoom lens system ZL in the first to third embodiments respectively, each separately showing the lens arrangements as observed at the wide-angle end (W), at a middle focal length (M), and at the telephoto end (T). In all of the first to third embodiments, the zoom lens system ZL is one having a five-lens-group, positive-negative-positive-negative-positive zoom arrangement, and forms an optical image IM of an object on the image sensor SR at a variable magnification. Here, zooming is achieved by varying the distances between the lens groups (specifically, the axial distances d5, d11, d18, and d20). FIGS. 14A to 14C show, in the form of arrows, the zooming movement loci in the first to third embodiment respectively. These zooming movement loci indicate how the first to fifth lens groups Gr1 to Gr5 move (i.e. how their positions relative to the image surface IM change) during zooming from the wide-angle end (W) to the telephoto end (T). The movement loci represented by broken-like arrows indicate that the fifth lens group Gr5 remains stationary during zooming (i.e. that it is a stationary lens group).

In any of the embodiments, as shown in FIGS. 1 to 3, the third lens group Gr3 includes a positive lens component GrP and a cemented lens element GrV having a positive optical power, and the cemented lens element GrV is moved in a direction (indicated by a double-headed arrow) perpendicular to the optical axis AX to correct image shake. That is, the cemented lens element GrV serves as the eccentric lens component. Moreover, in the third lens group Gr3, a stop (aperture stop) ST is disposed between the positive lens component GrP and the cemented lens element GrV, and the stop ST is moved along with the third lens group Gr3 during zooming (FIGS. 1 to 3). The lens arrangement of each of the embodiments will now be described in detail.

In the first embodiment (FIG. 1), the lens groups are each built as follows. The first lens group Gr1 is composed of, from the object side: a cemented lens element composed of a negative meniscus lens element concave to the image side and a positive meniscus lens element convex to the object side; and a positive meniscus lens element convex to the object side. The second lens group Gr2 is composed of, from the object side: a negative meniscus lens element concave to the image side; a biconcave negative lens element; and a positive meniscus lens element convex to the object side. The third lens group Gr3 is composed of, from the object side: a positive lens component GrP composed of a biconvex positive lens element; a stop ST; and a cemented lens element GrV composed of a biconvex positive lens element, a biconcave negative lens element, and a biconvex positive lens element. The fourth lens group Gr4 is composed solely of a negative meniscus lens element concave to the image side and having aspherical surfaces on both sides. The fifth lens group Gr5 is composed solely of a biconvex positive lens element having aspherical surfaces on both sides.

In the second embodiment (FIG. 2), the lens groups are each built as follows. The first lens group Gr1 is composed of, from the object side: a cemented lens element composed of a negative meniscus lens element concave to the image side and a positive meniscus lens element convex to the object side; and a positive meniscus lens element convex to the object side. The second lens group Gr2 is composed of, from the object side: a negative meniscus lens element concave to the image side; a biconcave negative lens element; and a positive meniscus lens element convex to the object side. The third lens group Gr3 is composed of, from the object side: a positive lens component GrP composed of a biconvex positive lens element; a stop ST; and a cemented lens element GrV composed of a biconvex positive lens element, a biconcave negative lens element, and a biconvex positive lens element. The fourth lens group Gr4 is composed solely of a negative meniscus lens element concave to the image side and having aspherical surfaces on both sides. The fifth lens group Gr5 is composed solely of a biconvex positive lens element having aspherical surfaces on both sides.

In the third embodiment (FIG. 3), the lens groups are each built as follows. The first lens group Gr1 is composed of, from the object side: a cemented lens element composed of a negative meniscus lens element concave to the image side and a positive meniscus lens element convex to the object side; and a positive meniscus lens element convex to the object side. The second lens group Gr2 is composed of, from the object side: a negative meniscus lens element concave to the image side; a biconcave negative lens element; and a positive meniscus lens element convex to the object side. The third lens group Gr3 is composed of, from the object side: a positive lens component GrP composed of a biconvex positive lens element; a stop ST; and a cemented lens element GrV composed of a biconvex positive lens element, a biconcave negative lens element, and a biconvex positive lens element. The fourth lens group Gr4 is composed solely of a negative meniscus lens element concave to the image side and having aspherical surfaces on both sides. The fifth lens group Gr5 is composed solely of a biconvex positive lens element having aspherical surfaces on both sides.

As shown in FIGS. 14A to 14C, in all of the first to third embodiments (FIGS. 1 to 3), the movement loci of the first to fourth lens groups Gr1 to Gr4, which are movable lens groups, are all curved. In the case of the first lens group Gr1, in a certain range of focal length between the wide-angle end (W) and the middle focal length (M), it is located closer to the image side than at the wide-angle end (W). Put another way, from the wide-angle end (W) to the middle focal length (M), the first lens group Gr1 first moves toward the image side and then makes a U-turn to move toward the object side thereafter, describing a locus convex to the image side. In the case of the second lens group Gr2, during zooming from the wide-angle end (W) to the telephoto end (T), it moves toward the image side monotonically, describing a movement locus without any extremum. In the case of the third lens group Gr3, and also the fourth lens group Gr4, in a certain range of focal length between the middle focal length (M) and the telephoto end (T), it is located closer to the object side than at the middle focal length (M). Put another way, from the middle focal length (M) to the telephoto end (T), the third lens group Gr3, and also the fourth lens group Gr4, first moves toward the object side and then makes a U-turn to move toward the image side thereafter, describing a locus convex to the object side.

With a unique arrangement according to the invention, like that of any of the embodiments described above, it is possible to realize a zoom lens system that offers a zoom ratio as high as about 12× and that offers, in part of its zoom range, a whole angle of view over 70 degrees; and in addition this is possible with high optical performance—about 50 µm or less of spherical aberration and curvature of field over the entire zoom range, and a maximum of about 5% of distortion—, with minimum degradation in imaging performance when correcting image shake, and with size as small as about 78 mm in total optical length. Thus it is possible to realize a satisfactorily compact zoom lens system that, despite having a zoom ratio as high as about 12×, offers high optical performance and that, even when correcting image shake, offers high optical performance, and to realize an image-sensing apparatus and a digital device incorporating such a zoom lens system. And employing such an image-sensing apparatus in a digital device such as a digital camera contributes to improving the digital device in terms of slimness, weight, size, cost, performance, functionality, and other respects.

EXAMPLES

Hereinafter, the optical arrangement and other features of more specific examples (Examples 1 to 3) of zoom lens systems according to the invention will be presented with reference to their construction data etc. Examples 1 to 3 presented below are numerical examples corresponding respectively to the first to third embodiments described previously. Thus the optical arrangement diagrams (FIGS. 1 to 3) and the movement locus diagrams (FIGS. 14A to 14C) for the first to third embodiments also show the lens arrangement, optical path, zooming movement, etc. of the corresponding ones of Examples 1 to 3.

Tables 1 to 3 show the construction data and other data of Examples 1 to 3 respectively. For each example, in the construction data section (headed "Surface Data"), there are listed, from the leftmost column rightward, the surface number, the radius of curvature r (mm), the axial distance d (mm), the index of refraction nd for the d-line, and the Abbe number vd for the d-line. A surface whose surface number is followed by an asterisk (*) is an aspherical surface, of which the surface shape is defined by conditional formula (AS) below. For each example, the aspherical surface data are listed in the section headed "Aspherical Surface Data" of the corresponding table. No term appears there that has a coefficient of 0; for all data, "E-n" stands for "×10$^{-n}$".

$$X(H)=(C0 \cdot H^2)/[1+\sqrt{1-(1+K) \cdot C0^2 \cdot H^2}]+\Sigma(Aj \cdot H^j) \quad (AS)$$

where

X(H) represents the displacement along the optical axis AX, at the height H (relative to the vertex);

H represents the height in a direction perpendicular to the optical axis AX;

C0 represents the paraxial curvature (=1/r);

K represents the conic coefficient; and

Aj represents the aspheric surface coefficient of order j.

In the section headed "Miscellaneous Data" of each table, there are listed the zoom ratio, the focal length (mm), the f-number, the half angle of view (degrees), the image height (mm), the lens total length, the back-focal length (BF, mm), the variable axial distances (mm). In the section headed "Zoom Lens Group Data" of each table, there are listed the focal lengths (mm) of the lens groups. Table 4 lists the values corresponding to the conditional formulae as actually found in each example.

FIGS. 4A to 4I, FIGS. 5A to 5I, and FIGS. 6A to 6I are longitudinal aberration diagrams of Examples 1 to 3 respectively, before eccentric shifting (in the ordinary state), in the state focused at infinity. Of these diagrams, FIGS. 4A-4C, 5A-5C, and 6A-6C show the aberrations as observed at the wide-angle end (W), FIGS. 4D-4F, 5D-5F, and 6D-6F show the aberrations as observed at the middle focal length (M), and FIGS. 4G-4I, 5G-5I, and 6G-6I show the aberrations as observed at the telephoto end (T); FIGS. 4A, 4D, 4G, 5A, 5D, 5G, 6A, 6D, and 6G show spherical aberration etc., FIGS. 4B, 4E, 4H, 5B, 5E, 5H, 6B, 6E, and 6H show astigmatism, and FIGS. 4C, 4F, 4I, 5C, 5F, 5I, 6C, 6F, and 6I show distortion. In these diagrams, the symbol "FNO" represents the f-number, and "Y'" represents the maximum image height (corresponding to the distance from the optical axis AX) on the sensing surface SS of the image sensor SR. In the spherical aberration diagrams, the solid line "d" and the dash-and-dot line "g" represent the spherical aberration (mm) for the d- and g-lines respectively, and the broken line "SC" represents the deviation (mm) from the state fulfilling the sine condition. In the astigmatism diagrams, the broken line "DM" and the solid line "DS" represent the astigmatism (mm) for the d-line on the meridional and sagittal planes respectively. In the distortion diagrams, the solid line represents the distortion (%) for the d-line.

FIGS. 7A to 7E and 8A to 8E, FIGS. 9A to 9E and 10A to 10E, and FIGS. 11A to 11E and 12A to 12E are lateral aberration diagrams of Examples 1 to 3 respectively, before eccentric shifting (in the ordinary state) and after eccentric shifting (in the state where image side is being corrected), in the state focused at infinity. Of these diagrams, FIGS. 7A, 7B, 8A, 8B, 9A, 9B, 10A, 10B, 11A, 11B, 12A, and 12B show lateral aberration before eccentric shifting, and FIGS. 7C, 7D, 7E, 8C, 8D, 8E, 9C, 9D, 9E, 10C, 10D, 10E, 11C, 11D, 11E, 12C, 12D, and 12E show lateral aberration after eccentric shifting, with the symbol "y'" representing the image height (corresponding to the distance from the optical axis AX) on the sensing surface SS of the image sensor SR); FIGS. 7A-7E, 9A-9E, and 11A-11E show the axial and off-axial degradation in lateral aberration as observed when, at the wide-angle end (W), an image shake of 0.3 degrees is corrected by eccentrically shifting the eccentric lens component, and FIGS. 8A-8E, 10A-10E, and 12A-12E show the axial and off-axial degradation in lateral aberration as observed when, at the telephoto end (T), an image shake of 0.3 degrees is corrected by eccentrically shifting the eccentric lens component. FIGS. 7A-7E, 8A-8E, 9A-9E, 10A-10E, 11A-11E, and 12A-12E reveal that degradation in aberration is small and that satisfactory performance is maintained when image shake is being corrected.

TABLE 1

Example 1 Unit: mm

Surface Data

| Surface | r | d | nd | vd |
|---|---|---|---|---|
| 1 | 48.134 | 1.500 | 1.84666 | 23.78 |
| 2 | 27.178 | 5.400 | 1.48749 | 70.45 |
| 3 | 395.693 | 0.100 | | |
| 4 | 27.076 | 3.600 | 1.77250 | 49.65 |
| 5 | 87.156 | Variable | | |
| 6 | 63.747 | 0.900 | 1.88300 | 40.80 |
| 7 | 9.313 | 4.300 | | |
| 8 | −30.028 | 0.700 | 1.72916 | 54.66 |
| 9 | 10.717 | 1.280 | | |
| 10 | 13.037 | 2.400 | 1.92286 | 20.88 |
| 11 | 41.109 | Variable | | |
| 12 | 38.386 | 1.600 | 1.80420 | 46.49 |
| 13 | −33.376 | 0.250 | | |
| 14 (Stop) | ∞ | 0.870 | | |
| 15 | 10.497 | 2.600 | 1.59551 | 39.23 |
| 16 | −8.918 | 2.000 | 1.80610 | 33.27 |
| 17 | 5.460 | 3.900 | 1.65844 | 50.84 |
| 18 | −11.890 | Variable | | |
| 19* | 8.445 | 1.400 | 1.60700 | 27.10 |
| 20* | 3.591 | Variable | | |
| 21* | 16.747 | 3.700 | 1.53048 | 55.72 |
| 22* | −13.010 | 2.488 | | |
| 23 | ∞ | 1.100 | 1.51680 | 64.20 |
| 24 | ∞ | 0.000 | | |

Aspherical Surface Data

Surface 19

K = 0.0000, A4 = −2.8022E−03, A6 = 1.2536E−04, A8 = −5.1902E−06, A10 = 8.6442E−08

Surface 20

K = 0.0000, A4 = −4.9351E−03, A6 = 1.0523E−04, A8 = −1.3011E−05, A10 = −6.0193E−07

Surface 21

K = 0.0000, A4 = 8.3340E−04, A6 = 3.9663E−05, A8 = −1.4564E−06, A10 = 2.9880E−08

Surface 22

K = 0.0000, A4 = 8.3422E−04, A6 = 2.9260E−05, A8 = −5.7893E−07, A10 = 2.9784E−08

TABLE 1-continued

Example 1 Unit: mm

Miscellaneous Data
Zoom Ratio 11.64

|  | (W) | (M) | (T) |
|---|---|---|---|
| Focal Length | 5.045 | 17.457 | 58.728 |
| F-Number | 2.850 | 3.624 | 3.678 |
| Half Angle of View | 38.683 | 12.237 | 3.713 |
| Image Height | 3.840 | 3.840 | 3.840 |
| Total Lens Length | 70.967 | 73.986 | 77.526 |
| BF | 1.2000 | 1.2000 | 1.2002 |
| d5 | 0.5000 | 13.9960 | 25.3371 |
| d11 | 24.0588 | 8.9834 | 0.7873 |
| d18 | 2.0000 | 4.2191 | 3.9155 |
| d20 | 3.1204 | 5.4992 | 6.1972 |

Zoom Lens Group Data

| Group | Starting Surface | Focal Length |
|---|---|---|
| 1 | 1 | 43.514 |
| 2 | 6 | −7.702 |
| 3 | 12 | 11.025 |
| 4 | 19 | −11.553 |
| 5 | 21 | 14.424 |

TABLE 2

Example 2 Unit: mm

Surface Data

| Surface | r | d | nd | vd |
|---|---|---|---|---|
| 1 | 46.462 | 1.500 | 1.84666 | 23.78 |
| 2 | 27.760 | 5.650 | 1.48749 | 70.45 |
| 3 | 510.613 | 0.100 |  |  |
| 4 | 27.019 | 3.550 | 1.72916 | 54.66 |
| 5 | 87.367 | Variable |  |  |
| 6 | 66.657 | 0.900 | 1.88300 | 40.80 |
| 7 | 9.073 | 4.600 |  |  |
| 8 | −25.018 | 0.700 | 1.71300 | 53.93 |
| 9 | 11.568 | 0.993 |  |  |
| 10 | 13.519 | 2.400 | 1.92286 | 20.88 |
| 11 | 49.920 | Variable |  |  |
| 12 | 25.934 | 1.500 | 1.81600 | 46.55 |
| 13 | −50.512 | 0.300 |  |  |
| 14 (Stop) | ∞ | 0.870 |  |  |
| 15 | 11.524 | 2.500 | 1.62004 | 36.30 |
| 16 | −8.716 | 2.000 | 1.80610 | 33.27 |
| 17 | 5.329 | 3.800 | 1.69350 | 53.31 |
| 18 | −13.644 | Variable |  |  |
| 19* | 7.864 | 1.000 | 1.60700 | 27.10 |
| 20* | 3.523 | Variable |  |  |
| 21* | 15.538 | 3.900 | 1.53048 | 55.72 |
| 22* | −14.663 | 2.520 |  |  |
| 23 | ∞ | 1.100 | 1.51680 | 64.20 |
| 24 | ∞ | 0.000 |  |  |

Aspherical Surface Data

Surface 19

$K = 0.0000, A4 = -4.2538E-03, A6 = 2.6299E-04, A8 = -1.5905E-05, A10 = 5.7811E-07$
Surface 20

$K = 0.0000, A4 = -6.5216E-03, A6 = 2.4943E-04, A8 = -2.5208E-05, A10 = -1.7950E-07$
Surface 21

$K = 0.0000, A4 = 6.9931E-04, A6 = 3.7076E-05, A8 = -1.2668E-06, A10 = 2.1961E-08$

TABLE 2-continued

Example 2 Unit: mm

Surface 22

$K = 0.0000, A4 = 6.1255E-04, A6 = 2.3777E-05, A8 = 1.9083E-07, A10 = -3.1664E-09$

Miscellaneous Data
Zoom Ratio 11.64

|  | (W) | (M) | (T) |
|---|---|---|---|
| Focal Length | 5.045 | 17.457 | 58.729 |
| F-Number | 2.850 | 3.664 | 3.754 |
| Half Angle of View | 38.686 | 12.354 | 3.726 |
| Image Height | 3.840 | 3.840 | 3.840 |
| Total Lens Length | 70.528 | 74.071 | 77.137 |
| BF | 1.2000 | 1.2000 | 1.2000 |
| d5 | 0.5000 | 13.8678 | 24.8824 |
| d11 | 23.8547 | 9.2381 | 0.7000 |
| d18 | 2.0000 | 3.9979 | 4.1111 |
| d20 | 3.0900 | 5.8834 | 6.3599 |

Zoom Lens Group Data

| Group | Starting Surface | Focal Length |
|---|---|---|
| 1 | 1 | 43.389 |
| 2 | 6 | −7.604 |
| 3 | 12 | 10.762 |
| 4 | 19 | −11.517 |
| 5 | 21 | 14.888 |

TABLE 3

Example 3 Unit: mm

Surface Data

| Surface | r | d | nd | vd |
|---|---|---|---|---|
| 1 | 44.541 | 1.500 | 1.84666 | 23.78 |
| 2 | 27.263 | 6.000 | 1.48749 | 70.45 |
| 3 | 625.513 | 0.100 |  |  |
| 4 | 25.575 | 3.600 | 1.71300 | 53.93 |
| 5 | 73.822 | Variable |  |  |
| 6 | 68.258 | 0.900 | 1.88300 | 40.80 |
| 7 | 9.313 | 4.600 |  |  |
| 8 | −23.877 | 0.700 | 1.71300 | 53.93 |
| 9 | 11.337 | 1.200 |  |  |
| 10 | 13.615 | 2.500 | 1.92286 | 20.88 |
| 11 | 51.596 | Variable |  |  |
| 12 | 60.702 | 1.400 | 1.77250 | 49.65 |
| 13 | −29.384 | 0.250 |  |  |
| 14 (Stop) | ∞ | 0.870 |  |  |
| 15 | 11.418 | 3.000 | 1.60342 | 38.00 |
| 16 | −8.031 | 2.000 | 1.80610 | 33.27 |
| 17 | 5.139 | 3.700 | 1.71700 | 47.99 |
| 18 | −12.324 | Variable |  |  |
| 19* | 8.368 | 1.600 | 1.60700 | 27.10 |
| 20* | 3.641 | Variable |  |  |
| 21* | 33.687 | 3.200 | 1.53048 | 55.72 |
| 22* | −9.41 | 2.910 |  |  |
| 23 | ∞ | 1.100 | 1.51680 | 64.20 |
| 24 | ∞ | 0.000 |  |  |

Aspherical Surface Data

Surface 19

$K = 0.0000, A4 = -2.3438E-03, A6 = 8.7115E-05, A8 = -3.0565E-06, A10 = -1.0968E-08$
Surface 20

$K = 0.0000, A4 = -4.4583E-03, A6 = 8.1245E-05, A8 = -1.3094E-05, A10 = -4.6460E-07$

TABLE 3-continued

Example 3 Unit: mm

Surface 21

K = 0.0000, A4 = 6.3402E−04, A6 = 5.5287E−05, A8 = −1.8789E−06,
A10 = 3.4962E−08
Surface 22

K = 0.0000, A4 = 7.4232E−04, A6 = 3.9793E−05, A8 = −8.6467E−07,
A10 = 2.8748E−08

Miscellaneous Data
Zoom Ratio 11.64

|  | (W) | (M) | (T) |
|---|---|---|---|
| Focal Length | 5.045 | 17.457 | 58.729 |
| F-Number | 2.850 | 3.639 | 3.631 |
| Half Angle of View | 38.694 | 12.150 | 3.697 |
| Image Height | 3.840 | 3.840 | 3.840 |
| Total Lens Length | 71.515 | 73.990 | 77.891 |
| BF | 1.2000 | 1.2000 | 1.2000 |
| d5 | 0.5000 | 13.2599 | 24.6092 |
| d11 | 23.4401 | 8.3454 | 0.8201 |
| d18 | 2.0000 | 4.0937 | 3.0614 |
| d20 | 3.2457 | 5.9611 | 7.0705 |

Zoom Lens Group Data

| Group | Starting Surface | Focal Length |
|---|---|---|
| 1 | 1 | 42.689 |
| 2 | 6 | −7.681 |
| 3 | 12 | 11.026 |
| 4 | 19 | −12.175 |
| 5 | 21 | 14.231 |

TABLE 4

| Values of Conditional Formulae | | Example 1 | Example 2 | Example 3 |
|---|---|---|---|---|
| Formula (1) | $nd3p$ | 1.80420 | 1.81600 | 1.77250 |
| Formula (2) | $(R1 + R2)/(R1 − R2)$ | 0.070 | −0.322 | 0.348 |
| Formula (3) | $(1 − \beta c)/\beta r$ (W) | 0.947 | 0.933 | 1.034 |
|  | (M) | 1.266 | 1.257 | 1.389 |
|  | (T) | 1.284 | 1.296 | 1.369 |

What is claimed is:

1. A zoom lens system having an image shake correcting capability, comprising, from an object side to an image side:
   a first lens group having a positive optical power;
   a second lens group having a negative optical power;
   a third lens group having a positive optical power;
   a fourth lens group having a negative optical power; and
   a fifth lens group having a positive optical power,
   wherein
   the third lens group includes a positive lens component and a cemented lens element having a positive optical power,
   the cemented lens element is moved in a direction perpendicular to an optical axis to correct image shake, and
   conditional formula (1) below is fulfilled:

$$1.7 < nd3p \qquad (1)$$

where
   nd3p represents an average index of refraction of one or more positive lens elements in the positive lens component.

2. The zoom lens system according to claim 1,
   wherein at least one positive lens element in the positive lens component fulfills conditional formula (2) below:

$$−0.7 < (R1+R2)/(R1−R2) < 0.6 \qquad (2)$$

where
   R1 represents a radius of curvature of an object-side surface of the at least one positive lens element in the positive lens component; and
   R2 represents a radius of curvature of an image-side surface of the at least one positive lens element in the positive lens component.

3. The zoom lens system according to claim 1,
   wherein the positive lens component is composed of one positive lens element.

4. The zoom lens system according to claim 1,
   wherein conditional formula (3) below is fulfilled over an entire zoom range:

$$0.5 < (1−\beta c)/\beta r < 3.0 \qquad (3)$$

where
   $\beta c$ represents a lateral magnification of the cemented lens element; and
   $\beta r$ represents a composite lateral magnification of all lens elements disposed to an image side of the cemented lens element.

5. The zoom lens system according to claim 1,
   wherein
   an object-side boundary surface with air of the cemented lens element is convex to the object side, and
   an image-side boundary surface with air of the cemented lens element is convex to the image side.

6. The zoom lens system according to claim 1,
   wherein the cemented lens element is composed of three lens elements cemented together, the three lens elements being, from the object side, a positive lens element, a negative lens element, and a positive lens element.

7. The zoom lens system according to claim 1,
   wherein the fifth lens group remains stationary in an optical axis direction during zooming.

8. The zoom lens system according to claim 1,
   wherein the fifth lens group is composed of one positive lens element.

9. The zoom lens system according to claim 1,
   wherein the fourth lens group is composed of one negative lens element.

10. An image-sensing apparatus comprising:
    a zoom lens system configured to form an optical image of a subject; and
    an image sensor configured to convert the optical image formed on a sensing surface thereof into an electrical signal,
    wherein
    the zoom lens system has an image shake correcting capability and comprises, from an object side to an image side:
    a first lens group having a positive optical power;
    a second lens group having a negative optical power;
    a third lens group having a positive optical power;
    a fourth lens group having a negative optical power; and
    a fifth lens group having a positive optical power,
    the third lens group includes a positive lens component and a cemented lens element having a positive optical power,
    the cemented lens element is moved in a direction perpendicular to an optical axis to correct image shake, and
    conditional formula (1) below is fulfilled:

$$1.7 < nd3p \qquad (1)$$

where
   nd3p represents an average index of refraction of one or more positive lens elements in the positive lens component.

11. A digital device comprising:

an image-sensing apparatus; and a controller configured to make the image-sensing apparatus shoot at least either a still picture or a moving picture of a subject, wherein the image-sensing apparatus comprises:

a zoom lens system forming an optical image of a subject; and an image sensor converting the optical image formed on a sensing surface thereof into an electrical signal, the zoom lens system has an image shake correcting capability and comprises, from an object side to an image side:

a first lens group having a positive optical power;

a second lens group having a negative optical power;

a third lens group having a positive optical power;

a fourth lens group having a negative optical power; and a fifth lens group having a positive optical power, the third lens group includes a positive lens component and a cemented lens element having a positive optical power, the cemented lens element is moved in a direction perpendicular to an optical axis to correct image shake, and conditional formula (1) below is fulfilled:

$$1.7 < nd3p \tag{1}$$

where $nd3p$ represents an average index of refraction of one or more positive lens elements in the positive lens component.

* * * * *